United States Patent
Diamos et al.

(10) Patent No.: US 9,424,038 B2
(45) Date of Patent: Aug. 23, 2016

(54) COMPILER-CONTROLLED REGION SCHEDULING FOR SIMD EXECUTION OF THREADS

(71) Applicant: NVIDIA Corporation, Santa Clara, CA (US)

(72) Inventors: Gregory Diamos, San Jose, CA (US); Mojtaba Mehrara, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 245 days.

(21) Appl. No.: 13/710,279

(22) Filed: Dec. 10, 2012

(65) Prior Publication Data

US 2014/0165049 A1    Jun. 12, 2014

(51) Int. Cl.
  *G06F 9/45* (2006.01)
  *G06F 9/30* (2006.01)
(52) U.S. Cl.
  CPC .......... *G06F 9/30076* (2013.01); *G06F 8/443* (2013.01); *G06F 8/453* (2013.01)
(58) Field of Classification Search
  USPC ......... 717/146, 150, 156; 712/220–221, 205, 712/226, 233–234; 711/149–150, 125, 170
  See application file for complete search history.

(56) References Cited

U.S. PATENT DOCUMENTS

| | | | |
|---|---|---|---|
| 2007/0050603 A1* | 3/2007 | Vorbach et al. | 712/221 |
| 2008/0034356 A1* | 2/2008 | Gschwind | G06F 8/445 717/149 |
| 2009/0240931 A1* | 9/2009 | Coon et al. | 712/234 |
| 2011/0072248 A1* | 3/2011 | Nickolls et al. | 712/233 |
| 2013/0219378 A1* | 8/2013 | Glaister et al. | 717/146 |
| 2014/0164737 A1* | 6/2014 | Collange et al. | 712/205 |

OTHER PUBLICATIONS

Fung et al, "Dynamic Warp Formation and Scheduling for Efficient GPU Control Flow", IEEE 2007, pp. 407-418 <Fung_warp2007.pdf>.*
Brunie et al, "Simultaneous Branch and Warp Interweaving for Sustained GPU Performance" Dec. 7, 2011, pp. 1-17 <WarpInterwv2011.pdf>.*
Diamos et al, "SIMD Re-Convergence at Thread Frontiers", MICRO' 11, Dec. 7 2011, p. 1-12 <re-converg2011.pdf>.*
Strong, H.R. "Vector Execution of Flow Graph (Extended Abstract)," IBM Research Laboratory, San Jose, CA 95193, 1980, pp. 108-116.

(Continued)

*Primary Examiner* — Tuan Vu
(74) *Attorney, Agent, or Firm* — Artegis Law Group, LLP

(57) ABSTRACT

A compiler-controlled technique for scheduling threads to execute different regions of a program. A compiler analyzes program code to determine a control flow graph for the program code. The control flow graph contains regions and directed edges between regions. The regions have associated execution priorities. The directed edges indicate the direction of program control flow. Each region has a thread frontier which contains one or more regions. The compiler inserts one or more update predicate mask variable instructions at the end of a region. The compiler also inserts one or more conditional branch instructions at the end of the region. The conditional branch instructions are arranged in order of execution priority of the regions in the thread frontier of the region, to enforce execution priority of the regions at runtime.

21 Claims, 9 Drawing Sheets

(56) References Cited

OTHER PUBLICATIONS

Levinthal et al. "Chap—A SIMD Graphics Processor," Computer Graphics Project, Lucasfilm Ltd, vol. 18, No. 3, Jul. 1984, pp. 77-82.
Shin, Jaewook "Introducing Control Flow into Vectorized Code," PACT '07 Proceedings of the 16th International Conference on Parallel Architecture and Compilation Techniques, IEEE Computer Society Washington, DC USA, ISBN: 0-7695-2944-5, © 2007, pp. 280-291.
Karrenberg et al. "Whole-Function Vectorization," Code Generation and Optimization (CGO), 2011 9th Annual IEEE/ACM International Symposium on Apr. 2-6, 2011, pp. 141-150.
Diamos et al. "SIMD Re-Convergence at Thread Frontiers," Georgia Institute of Technology, Atlanta, GA, USA, MICRO'11, Porto Alegre, Brazil, Dec. 3-7, 2011, pp. 1-12.
Pharr, M.: ispc: A SPMD compiler for high-performance CPU programming. In: proceedings of the conference on innovative parallel computing (InPar), May 13-14, 2012, CA, pp. 1 to 13.

\* cited by examiner

COMPILER-CONTROLLED REGION SCHEDULING FOR SIMD EXECUTION OF THREADS

BACKGROUND OF THE INVENTION

1. Field of the Invention

The present invention generally relates to parallel computing and, more specifically, to compiler-controlled region scheduling for SIMD (single-instruction multiple data) execution of threads.

2. Description of the Related Art

A Single-Instruction-Multiple-Data (SIMD) processor is a processor that executes a set of instructions, with each instruction operating on multiple different data values simultaneously. Applications written for SIMD processors may be divided logically into "warps", where each warp is a group of "threads" that execute cooperatively and simultaneously on a SIMD processor. Generally, each thread in a warp executes instructions on a different data value, but executes the same instruction as other threads in the warp.

Execution of threads in a warp may diverge. If program instructions dictate that one or more threads in a warp takes a first path while one or more other threads in the warp takes a second path, then the threads in the warp diverge. Thread divergence may happen for a number of reasons. For example, because of the possibility of conditional branches in a warp, where each thread may or may not branch based on the results of a branch condition, and because evaluation of the branch condition may be based on data values that may be different for each thread, the threads evaluating the branch condition may reach a different branch condition result and may diverge. Such divergent execution may be referred to as "divergent control flow" herein.

Because all threads in a warp typically execute the same instruction, execution of a program with divergent control flow involves execution on all control flow paths that each thread follows. Execution on all control flow paths in this manner may involve execution down multiple paths where some threads are "active," (currently executing) while other threads are "inactive" (waiting to execute). Execution down multiple paths may cause (and typically does cause) the execution time of the entire warp to be longer than the execution time spent on any one single thread. Techniques exist for determining which divergent threads should execute at which time. However, some existing techniques may not be tied to prioritized flow, may not schedule threads efficiently or may not ensure early re-convergence of threads.

As the foregoing illustrates, more effective techniques are needed for managing the execution of threads within a warp throughout different regions of a program.

SUMMARY OF THE INVENTION

One embodiment of the present invention sets forth a method for modifying program code to schedule threads to execute different regions of a program. The method comprises the steps of analyzing a control flow graph that is based on the program code, and that comprises a plurality of regions, each region representing a portion of the program code, each region being assigned an execution priority, and each region having a thread frontier containing one or more thread frontier regions, inserting one or more update predicate mask variable instructions at the end of a first region included in the plurality of regions, and inserting one or more conditional branch instructions at the end of the first region that are arranged to reflect execution priority of the one or more thread frontier regions in the thread frontier of the first region.

One advantage of the disclosed technique is that the disclosed technique can be used to determine which threads should execute which regions of a program at what time. An additional advantage is that the disclosed technique enables threads to re-converge at an early point.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
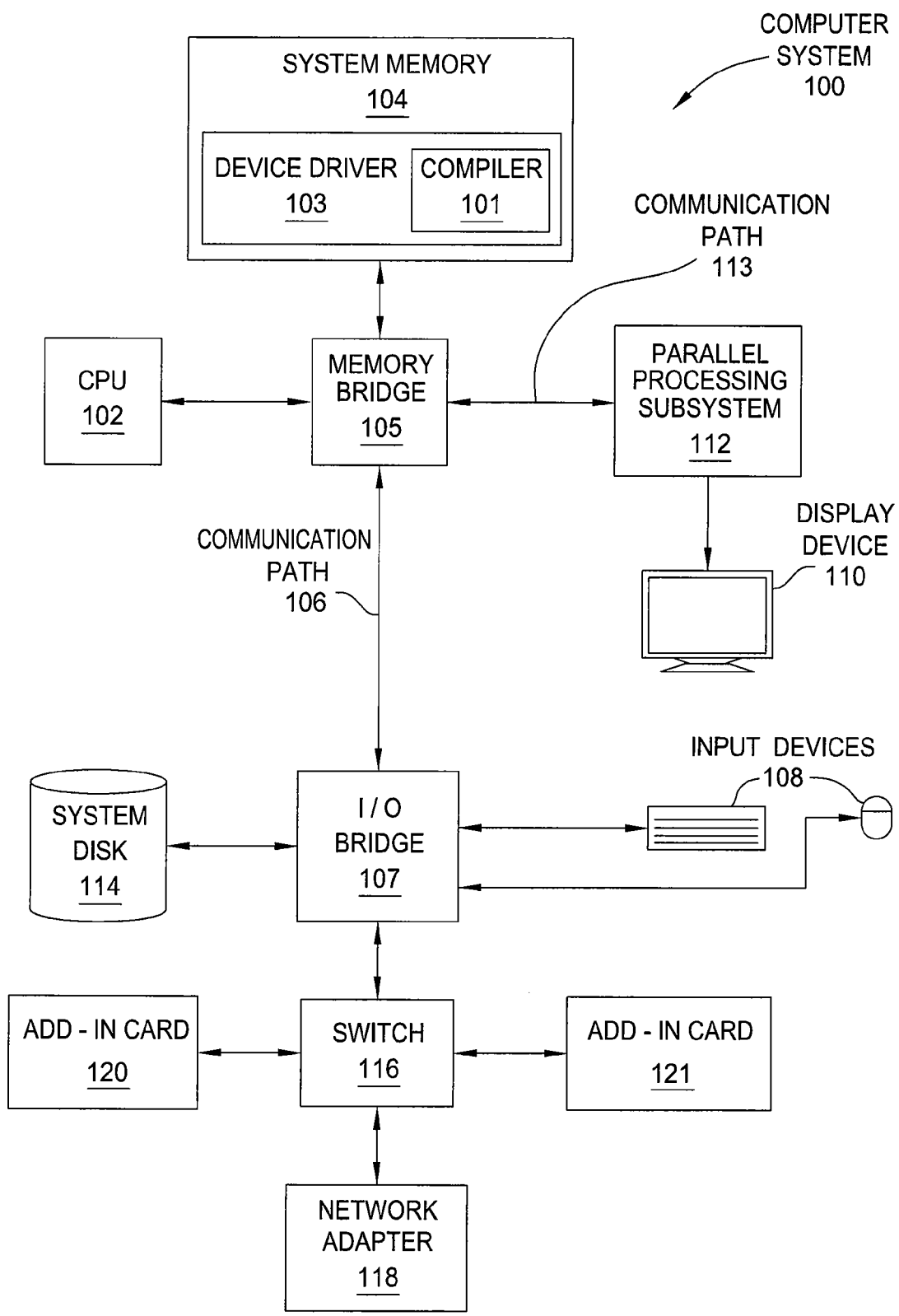
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

A compiler 101 may be embedded within device driver 103. The compiler 101 compiles program instructions as needed for execution by parallel processing subsystem 112. During such compilation, the compiler 101 may apply transforms to program instructions at various phases of compilation. In another embodiment of the present invention, the compiler 101 may be a stand-alone application.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
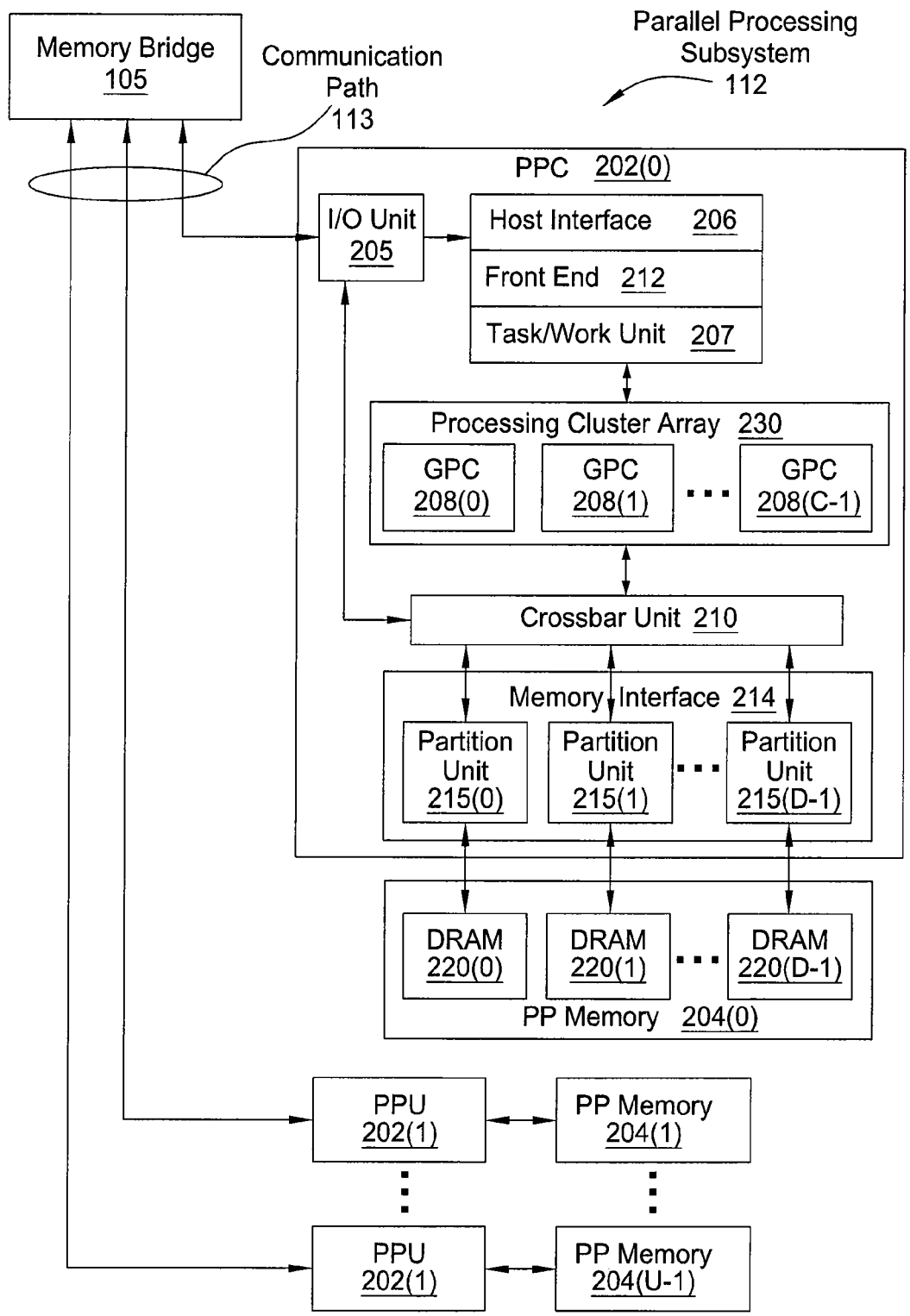
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) (not shown) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
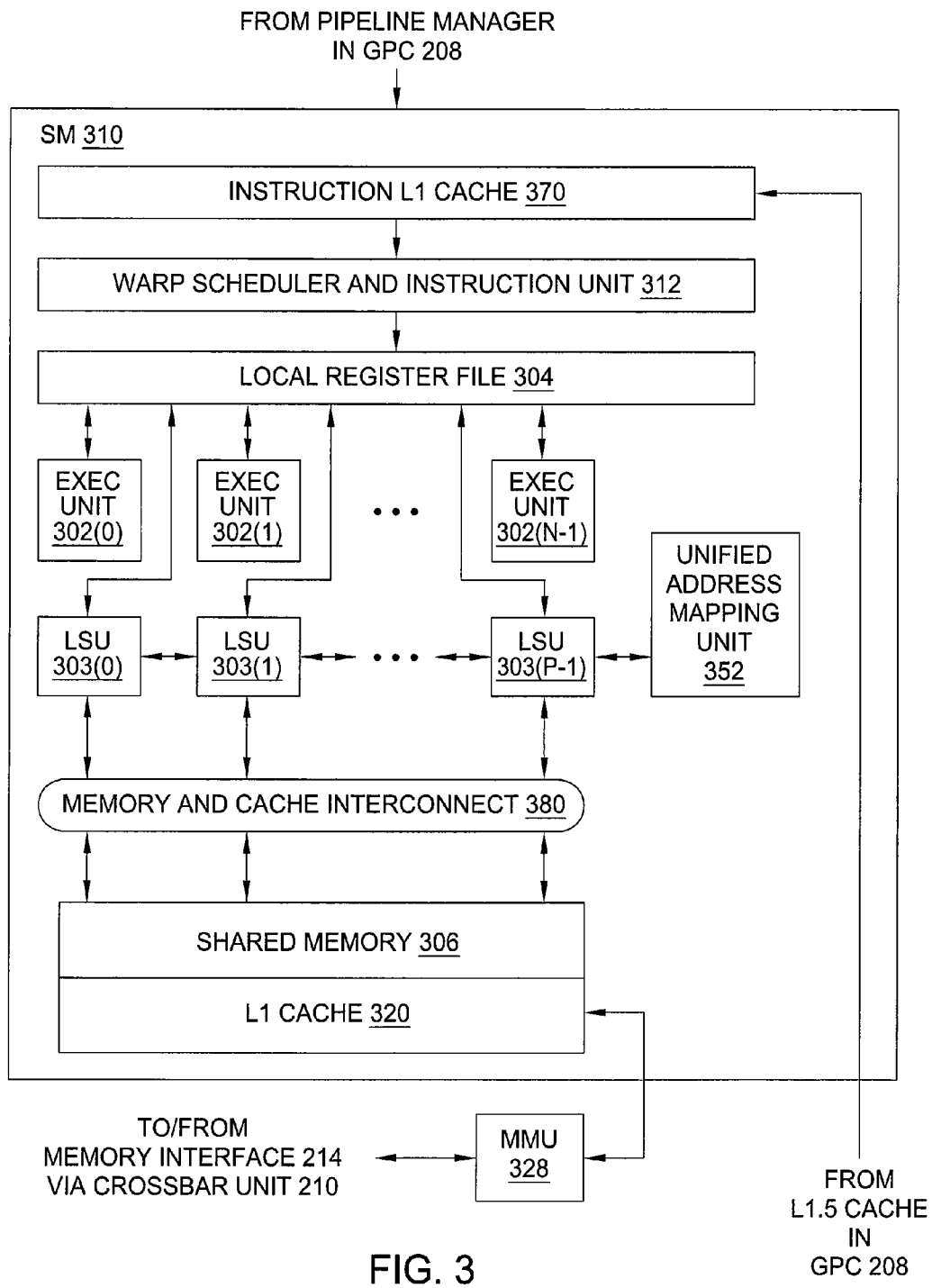
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID;

each thread ID register is accessible only by a respective one of the exec unit 302. Special registers may also include additional registers, readable by all threads that execute the same processing task represented by a TMD (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 320 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Compiler-Controlled Region Scheduling for SIMD Execution of Threads

As explained above, a warp is a thread group that executes on a SM 310. Sometimes, warps may diverge, meaning that threads in the warp are instructed to follow different control flow paths. These different control flow paths typically cannot be executed simultaneously on the SM 310. Therefore, the different control flow paths are executed at different times. A technique is typically utilized to schedule threads executing on different control flow paths. A technique is provided herein that is a compiler-controlled technique that modifies program code to insert instructions to schedule threads through the use of predication (selective disabling of thread execution) and branch instructions. The predication and branch instructions serve to implement a predetermined prioritized control flow through the program.

Figure 4:
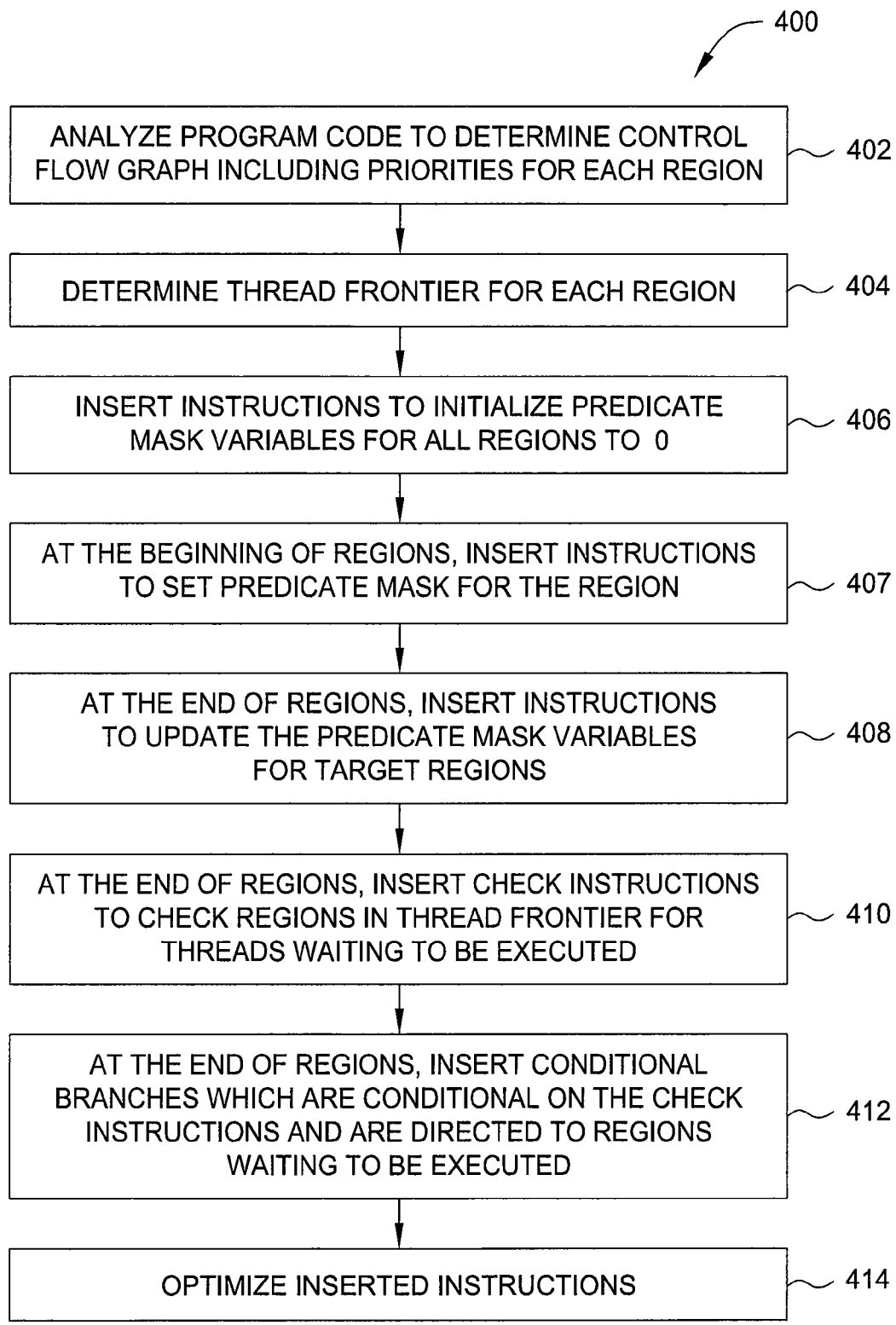
FIG. 4 is a flow diagram of method steps for providing instructions to schedule threads for executing different regions of a program, according to one embodiment of the present invention.

FIG. 4 is a flow diagram of a method 400 having steps for compiler 101 to insert instructions into the program code to schedule threads executing on different control flow paths, according to one embodiment of the present invention. The description of the method 400 shown in FIG. 4 may make reference to FIGS. 5A-5C, which depict an example control flow graph 500, example predicate mask variables 520 and an example check block 510. Although the method steps are described in conjunction with FIGS. 1-3 and 5A-C, persons skilled in the art will understand that any system configured to perform the method steps, in any order, falls within the scope of the present invention. Throughout this disclosure, the compiler 101 is described as performing certain steps with respect to a region being analyzed. As used throughout this disclosure, the symbol "R" refers to the region being analyzed, also referred to herein as an "analysis region".

Figure 5A:
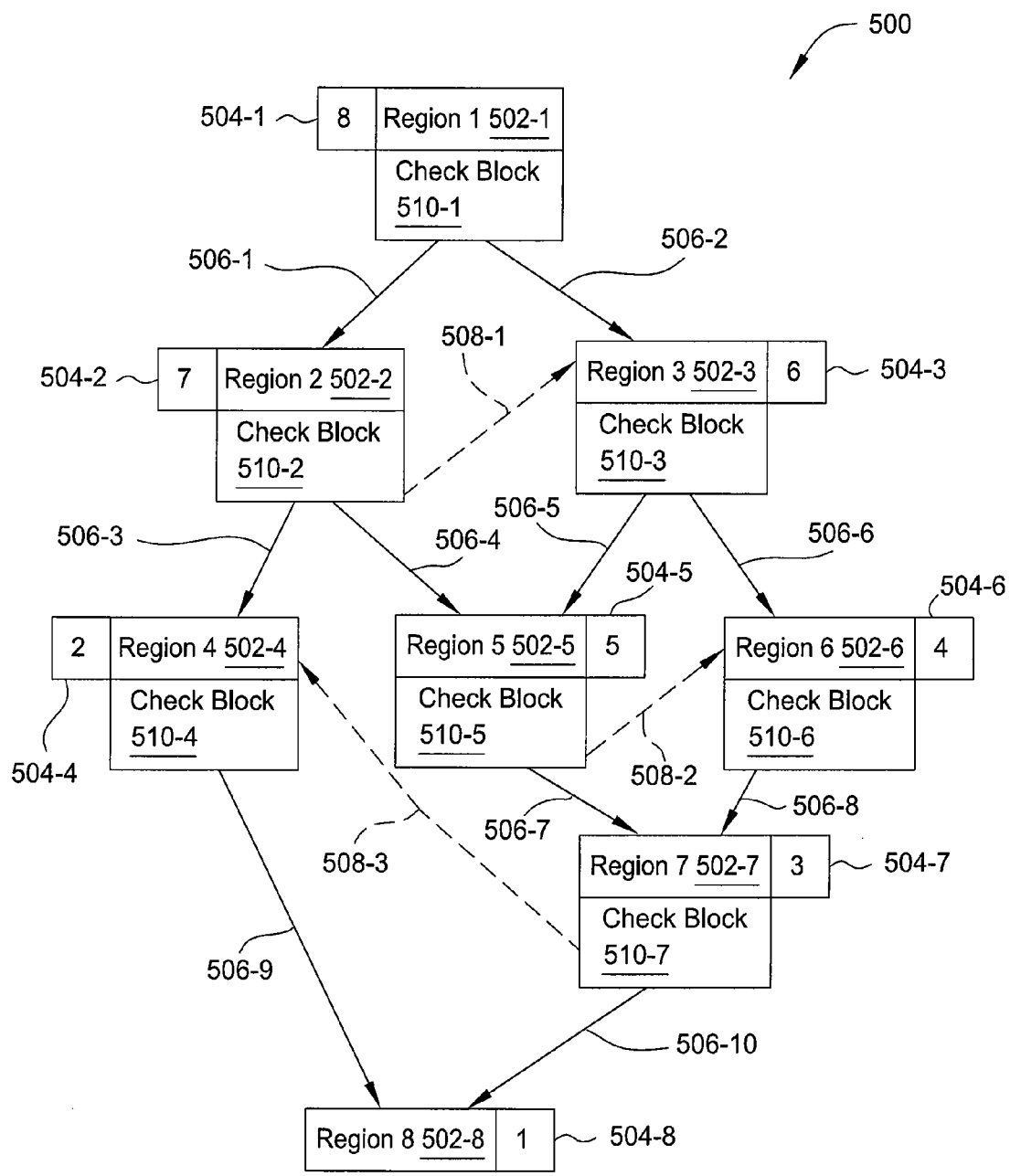
FIG. 5A is a control flow graph setting forth prioritized execution of different regions of a program, according to one embodiment of the present invention.

As shown, method 400 begins in step 402, where compiler 101 may analyze program code using control flow analysis to generate a control flow graph, such as a flow control graph 500 shown in FIG. 5A, as is known. Control flow graph 500 conceptually illustrates control flow for program code comprising a particular sequence of instructions in a program.

Referring to FIG. 5A, control flow graph 500 includes one or more "regions" such as regions 1-8 502-1-502-8 that have execution priorities 504 and that are connected by directed edges 506. A control flow graph is a representation, using graph notation, of all paths that might be traversed by a thread through a program during its execution. A basic block is a finite sequence of instructions having one entry point and one exit point. A region is a connected subgraph of a control flow graph. Regions contain at least one basic block. Threads that enter a single region 502 together generally do not diverge at least until they have finished executing the single region 502. If divergent code (such as a conditional branch instruction) is present at the end of a region 502, threads that have executed the region 502 together may diverge. The divergence of threads is possible, for example, at the end of region 1 502-1. As indicated by directed edges 506-1 and 506-2, some threads may travel to region 2 502-2, while other threads may travel to region 3 502-3. Generally speaking, threads travel in the direction indicated by the arrow of directed edges 506-1-506-10. While some arrows on the control flow graph 500, such as arrows 506-1 and 506-2 indicate a divergent path, other arrows, such as arrows 506-9 and 506-10 indicate a convergent path. Threads leaving from both region 7 502-7 and region 4 502-4, converge in region 8 502-8. Regions can have predecessors and successors. A first region is a predecessor of a second region if a directed edge is directed from the first region to the second region. Also, a first region is a successor of second region if a directed edge is directed from the second region to the first region. Predecessors and successors may also be referred to herein as "predecessor regions" and "successor regions."

Preferably, regions are as large as possible. However, regions created through control flow analysis may comprise single basic blocks, as are known in the art, that may be smaller than desirable. To create large regions from single basic blocks, uniform branches are identified through convergence analysis. A region for enlargement is then selected and analyzed. If all basic blocks that are predecessors of the region for enlargement end with uniform branches and are all part of the same region (referred to as a "predecessor region"), then the predecessor region is added to the region for enlargement. This enlargement procedure may be repeated recursively for all regions to achieve large region sizes. Preferably, the control flow graph 500 depicted in FIG. 5A includes regions that are as made large as possible in this manner.

Execution priorities 504-1-504-8 determine the order in which regions are executed. In the control flow graph 500 shown in FIG. 5A, a higher number indicates a higher execution priority. In other words, if a choice is provided, threads in a region with a higher priority execute before threads in a region with a lower priority. Thus, in the example shown in FIG. 5A, if there are threads waiting to execute region 2, which has priority 7, as well as threads waiting to execute region 3, which has priority 6, the threads waiting to execute region 2 execute before those waiting to execute region 3. Any conventional algorithm may be used to determine the execution priority of regions in the control flow graph.

Implementing the control flow required for enforcing execution priorities of regions may require the use of implicit branches such as implicit branches 508-1-508-3. These branches 508 ensure that the regions 502 execute in priority order by providing paths between regions 502 that are not necessarily linked together by the original program code. For example, if some threads have passed to region 2 502-2, which has just finished executing, but there are some threads waiting to be executed both in region 4 502-4, and region 3 502-3, region 3 502-3 generally executes first. However, there is no directed edge from region 2 502-2 to region 3 502-3. Thus, implicit branch 508-1 is used transfer control from region 2 502-2 to region 3 502-3.

Referring back to FIG. 4, in step 404, the compiler 101 determines thread frontiers for each region 502. For each region, a thread frontier comprises all regions 502 where threads may be waiting to execute, and takes into account the directed edges 506 in the graph, as well as the execution priorities 506. Regions 502 within thread frontiers may be referred to as "thread frontier regions" herein.

For example, referring again to FIG. 5A, at the top of the control flow graph 500, at the beginning of region 1 502-1, the thread frontier comprises no regions. This is because when threads are executing region 1, there is no way for any threads to have reached any other region yet, as region 1 502-1 is the location where the control flow graph 500 begins. At the end of region 1 502-1, however, it is possible for threads to travel to either region 2 502-2 or region 3 502-3. Therefore, the thread frontier at the end of region 1 comprises regions 2 502-2 and 3 502-3.

At the end of region 2 502-1, the thread frontier comprises regions 4 502-4, 5 502-5, and 3 502-3. This is both because of the divergent control flow at the end of region 2 502-2, indicated by arrows 506-3 and 506-4, as well as the fact that some threads may be waiting to execute region 3 502-3 due to the fact that the priority 504-2 of region 2 502-2 is higher than the priority 504-3 of region 3. Thus, there are three places where threads may be waiting to execute: region 3 502-3, where threads that branched from region 1 502-1 may be waiting, as well as both branch targets 502-4 and 502-5.

Continuing with the example, at the end of region 3 502-3, the thread frontier comprises regions 4 502-4, 5 502-5, and 6 502-6, but does not include region 2 502-2. Region 2 502-2 is not included because it has a higher priority (7) than that of region 3 502-3 (6). Thus, at the end of region 3 502-3, all threads that may have entered region 2 502-2 have finished executing and there can be no threads waiting to execute region 2 502-2. However, as region 3 502-3 has a higher priority than both branch targets of region 2 502-2, which includes regions 4 502-4 and 5 502-5, some threads may flow to regions 4 502-4 and 5 502-5 from region 2 502-2 before control transfers to region 3 502-3, and while threads are executing region 3 502-3, there may be threads waiting to execute either of regions 4 502-4 or 502-5. Further, because region 6 502-6 is a branch target of region 3 502-3 itself, threads may flow from region 3 502-3 to region 6 502-6 and therefore threads may be waiting to execute region 6 502-6. Therefore, the thread frontier of region 3 502-3 comprises regions 4 502-4, 5 502-5 and 6 502-6.

Skipping ahead, the thread frontier for region 7 502-7 comprises regions 4 502-4 and 8 502-8. Region 4 502-4 is in the thread frontier because there may be threads that branched off of region 2 502-2 waiting to execute region 4 502-4. Because region 4 502-4 has a priority of 2, which is lower than that of region 7 502-7, which has a priority of 3, any threads waiting to execute region 4 502-4 have not had a chance to execute prior to the execution of region 7 502-7. Region 8 502-8 is a successor of region 7 502-7, but has a priority lower than that of region 4 502-4, so threads may be waiting in region 8 502-8 as well. Thread frontiers may be determined in any known way.

Referring back to FIG. 4, in step 406, the compiler 101 inserts instructions to initialize predicate mask variables to 0. Predicate mask variables exist for each region 502 and indicate which threads are executing or are waiting to execute the region corresponding to the predicate mask variable. A predicate mask variable with a value of 0 indicates that no threads are currently executing or waiting to execute the corresponding region. When the program begins, since no threads have entered any region, all predicate mask variables are initialized to 0. A special predicate mask variable "m", also referred to herein as a current region predicate mask, is used to set the predicate mask for the region that is currently executing. When control flows to a new region, the variable m is set to be equal to the predicate mask variable for the new region, and instructions are predicated based on variable m.

Figure 5B:
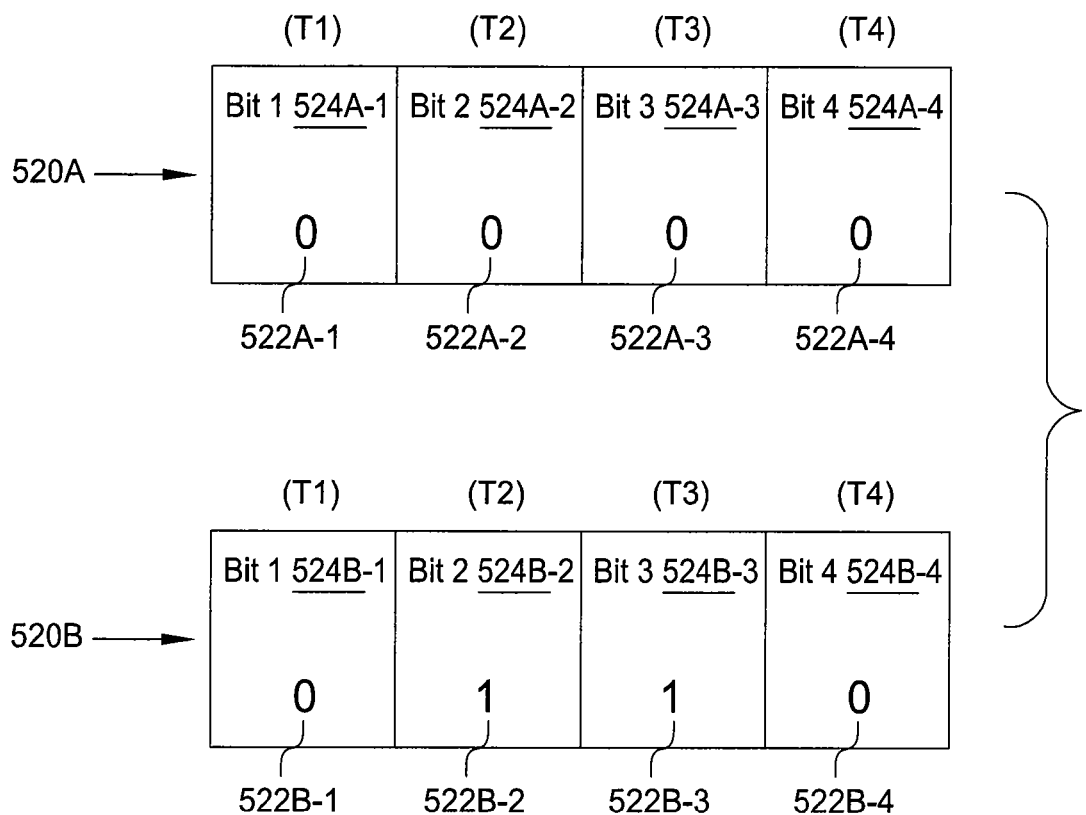
FIG. 5B is a conceptual illustration of example predicate mask variables, according to one embodiment of the present invention.

FIG. 5B is an illustration of conceptual versions of example predicate mask variables 520A, 520B. Predicate mask variables 520A, 520B comprise a bitmask having a number of bits 524A, 524B equal to the number of threads in a warp. In FIG. 5B, each predicate mask variable 520A, 520B has 4 bits 524A-1-524A-4, 524B-1-524B-4. Each bit in the bitmask represents a different thread in the warp. Therefore, predicate mask variables 520A, 520B can be used in conjunction with a warp that has 4 threads. The indication of which thread each bit 524 corresponds to is shown in FIG. 5B above each bit with the text "(Tx)", where "x" is a number identifying the thread.

A value of 1 in the bitmask means that the corresponding thread is currently executing or waiting to execute the corresponding region, while a value of 0 means that the corresponding thread is not currently executing and not waiting to execute the corresponding region.

In FIG. 5B, each of the bits 524A, 524B has a value 522A-1-522A-4, 522B-1-522B-4. As all bits 524A in variable 520A are set to 0, variable 520A represents a region in which no threads are executing or waiting to execute. In variable 520B, bits 522B-1 and 522B-4 are set to 0, while bits 522B-2 and 522B-3 are set to 1. Thus, threads T2 and T3 are either currently executing or waiting to execute the region represented by predicate mask variable 520B, while threads T1 and T4 are neither currently executing, nor waiting to execute the region represented by predicate mask variable 520B.

Referring back to FIG. 4, in step 407, the compiler 101 inserts instructions at the beginning of each region to set bitmask variable "m" to be equal to the predicate mask variable for the corresponding region. Bitmask variable "m" contains information regarding which threads are currently executing a currently executing region and is laid out in a similar format to the bitmask variables 520A and 520B shown in FIG. 5B. Specifically, "1's" in m indicate that the respective thread is currently executing the currently executing region, while "0's" in m indicate that the respective thread is not currently executing the currently executing region.

In step 408, the compiler 101 analyzes a region, referred to herein as an "analysis region" or by the symbol "R", and inserts instructions into a check block 510, shown in FIG. 5A, in analysis region R to update the predicate mask variables 520, shown in FIG. 5B, for successors of the analysis region R. In step 408, instructions are inserted into check blocks 510 (shown in FIG. 5A) for all regions in the control flow graph (such as control flow graph 500 in FIG. 5A) being analyzed.

Referring again to FIG. 5A, successors of a region, for example, region 2 502-2, comprise regions that are the target of branch instructions at the end of region 2 502-2, as well as any region to which a directed edge 506 indicates that control should flow, but do not include regions pointed to by implicit branches 508. This is because implicit branches 508 only represent the transfer of current control flow to threads waiting in another region but do not represent the actual transfer of threads to that region, since threads may only flow through directed edges 506 in the graph. The successors of region 2 502-2 comprise regions 4 502-4 and 5 502-5, but not region 3 502-3.

Figure 5C:
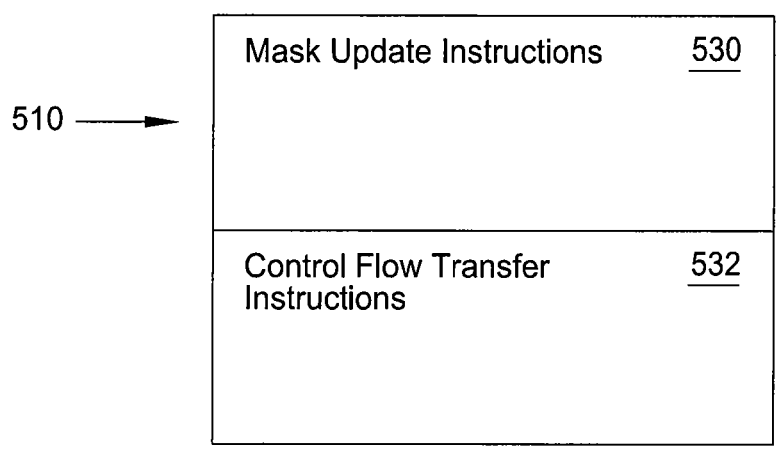
FIG. 5C is a conceptual illustration of an example layout of a check block that includes mask update instructions and control flow transfer instructions, according to one embodiment of the present invention.

Referring still to FIG. 5A, check blocks 510 exist at the end of regions 502. FIG. 5C illustrates an exemplary check block 510, which includes mask update instructions 530 (which are discussed below with respect to step 408) followed by control flow transfer instructions 532 (which are discussed below with respect to steps 410 and 412). The instructions to update the predicate mask variables 520 (also referred to as "mask update instructions" 530 herein) allow predicate mask variables 520 to be updated at run-time, i.e., during program execution.

Referring back to FIG. 4, in steps 410 and 412, the compiler 101 inserts check instructions and conditional branch instructions that are conditional on the check instructions and are directed to regions waiting to be executed. These check instructions and conditional branch instructions are inserted into control flow transfer instructions 532 of the check block 510, shown in FIG. 5C. Steps 410 and 412 are discussed in more detail below with respect to FIG. 7, which depicts a method for inserting check and branch instructions for an analysis region. The method depicted in FIG. 7 can be repeated for each region for which check and branch instructions are to be inserted.

In step 414, the instructions inserted in method 400 are optimized for efficiency. Once compiler 101 has replaced branch instructions with instructions that manipulate predicate masks, the code can be further optimized. Many optimization techniques can be used, such as "common subexpression elimination", "constant propagation", "strength reduction", "loop-invariant code motion", and "partial redundancy elimination." These optimization techniques may remove some of the instructions inserted at the end of regions.

Figure 6:
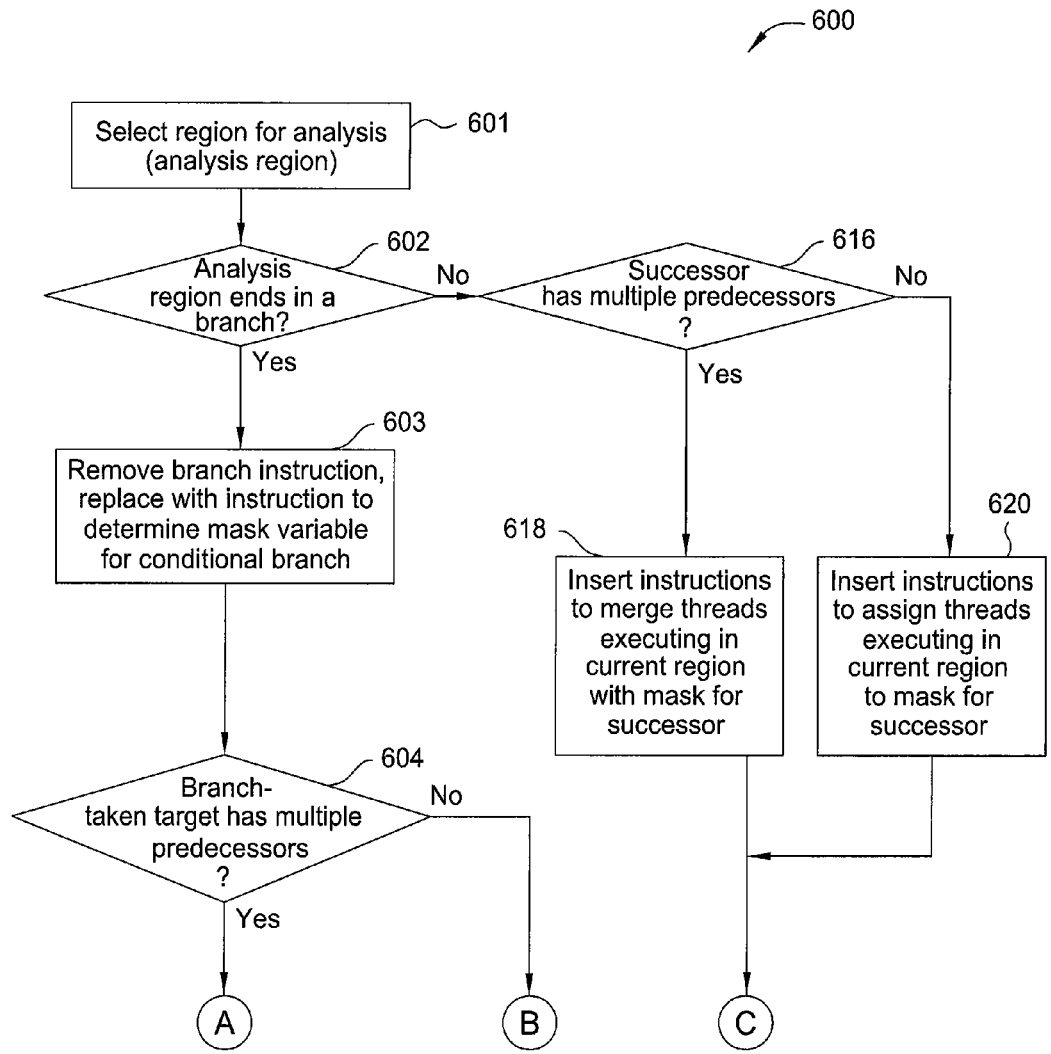
FIG. 6 is a flow diagram of method steps for inserting instructions to update predicate mask variables, according to one embodiment of the present invention.
Figure 6:
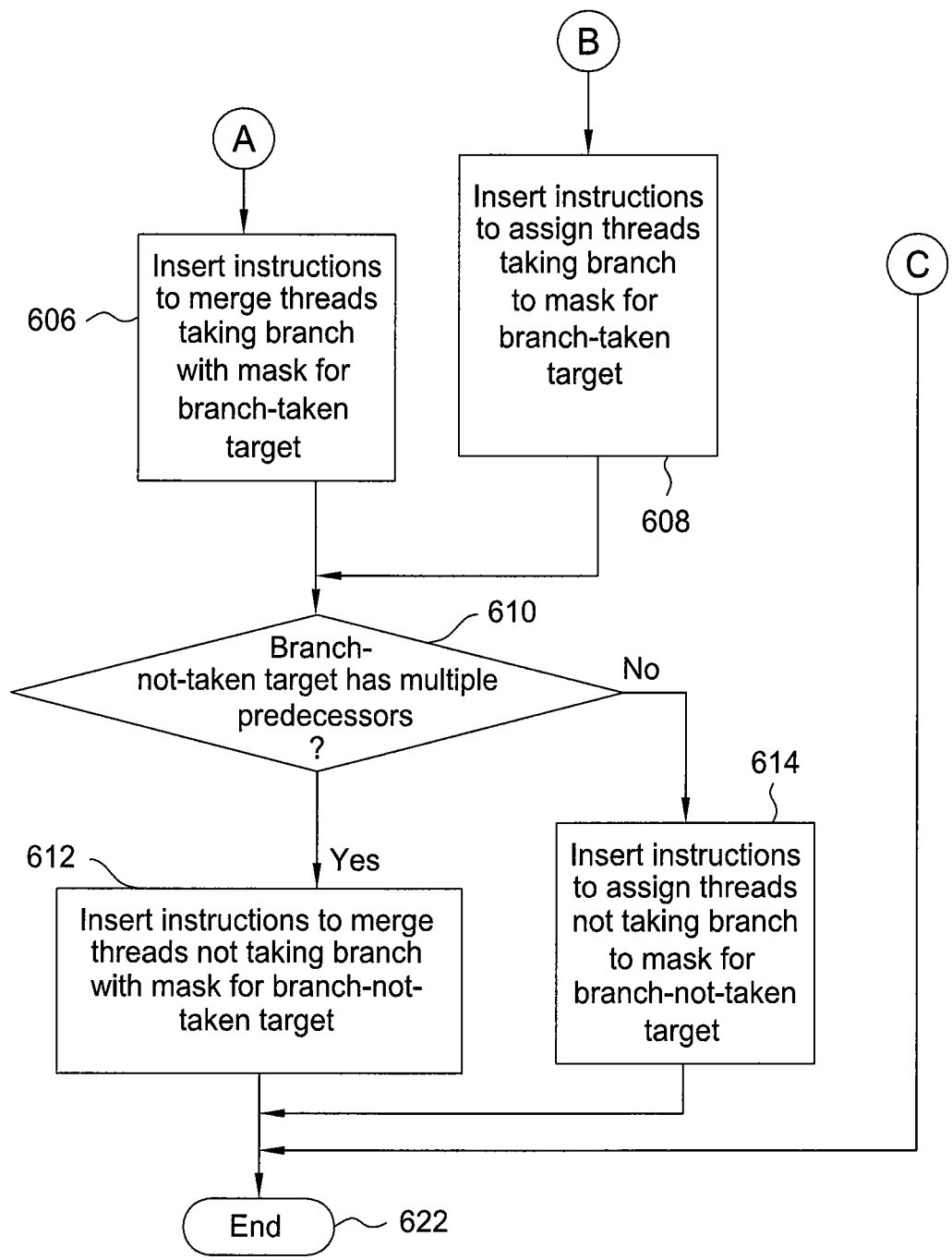
Figure 7:
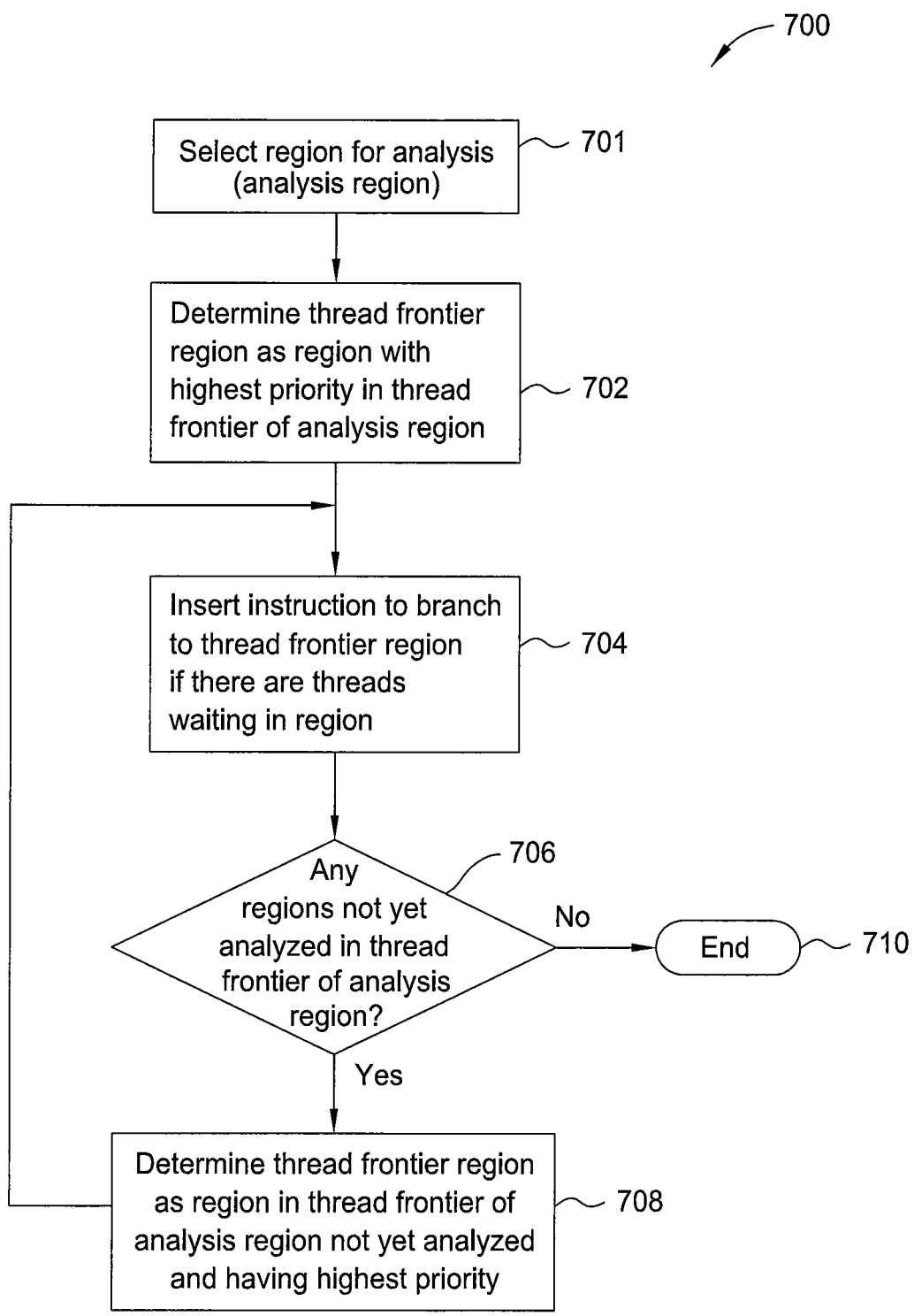
FIG. 7 is a flow diagram of method steps for determining checks and conditional branch instructions to be inserted into program code of the program, according to one embodiment of the present invention.

FIGS. 6 and 7 present example methods by which the compiler 101 analyzes a region and executes steps 408, 410 and 412 shown in FIG. 4. More specifically, FIG. 6 presents an example method for executing step 408 on one region, and FIG. 7 presents an example method for executing steps 410 and 412 on one region. Since a compiler 101 executing the method steps depicted in FIGS. 6 and 7 inserts instructions in one region, the compiler 101 can repeat the methods depicted in FIGS. 6 and 7 for all regions.

The disclosure provided with respect to FIGS. 6 and 7 may make reference to certain pseudo-code expressions. These pseudo-code expressions are intended to conceptually represent program instructions, but do not necessarily represent instructions in any specific language or instruction set. The discussion provided with respect to FIGS. 6 and 7 may make reference to certain symbols. Such symbols include: "R"—also referred to as an "analysis region", and which is the region being analyzed by the compiler in the methods described with respect to FIGS. 6 and 7, "s"—the predicate mask variable for the successor, or branch-taken target region of the analysis region, "n"—the predicate mask variable for the branch-not-taken target region of the analysis region, and "C"—the branch condition bitmask variable for any branch at the end of the analysis region.

FIG. 6 is a flow diagram of method steps for inserting instructions to update the predicate mask variables for particular regions, according to one embodiment of the present invention. Although the method steps are described in conjunction with FIGS. 1-3 and 5A-5C, persons skilled in the art will understand that any system configured to perform the method steps, in any order, falls within the scope of the present invention.

The method 600 depicted in FIG. 6 determines instructions to be inserted into a single region, the region being analyzed by the compiler 101, also referred to as the analysis region, or region R. To determine instructions to be inserted into every region in a control graph, the method in FIG. 6 is repeated for all such regions.

Using the steps of the method 600 shown in FIG. 6, the compiler 101 analyzes an analysis region, region R and determines instructions to insert into the check block 510 at the end of R. A control flow graph and thread frontiers have already been generated in steps 402 and 404, respectively. These control flow graphs and thread frontiers can be used by the compiler 101 to execute steps 601-622 shown in FIG. 6.

As shown, method 600 begins in step 601, where the compiler 101 selects a region to be analyzed—an analysis region, also referred to herein as region R. In step 602, the compiler 101 determines whether region R ends with a branch instruction. The paths reached by following the "yes" and "no" arrows extending from step 602 in FIG. 6 reflect the fact that if the analysis region does end with a branch instruction, then the analysis region has two successors, and therefore predicate mask variables for two different regions—the two successors, also referred to as the branch-taken target and the branch-not-taken target—are updated, while if the analysis region does not end with a branch instruction, then the analysis region only has one successor, and only one predicate mask variable is updated. Steps 604, 606, and 608 represent the flow logic for setting the predicate mask variable for the branch-taken target, while steps 610, 612 and 614 represent the flow logic for setting the predicate mask variable for the branch-not-taken target. Steps 618 and 620 represent the flow logic for setting the predicate mask variable for the non-branch successor.

If the analysis region ends in a branch instruction, the compiler 101 proceeds to step 603, in which the compiler 101 removes the branch instruction and the compiler 101 inserts an instruction to determine the value of a branch condition bitmask variable, also referred to herein by the symbol "C". The branch condition bitmask variable is a bitmask containing bits that each correspond to a different thread. The branch condition bitmask variable is formatted in a similar manner as predicate bitmask variables 520A and 520B in FIG. 5B. For each bit in the branch condition bitmask variable, a thread that evaluates the branch condition of the removed branch instruction as true is reflected by the value "1", while a thread that evaluates the branch condition as false is reflected by the value "0". Therefore, C contains information regarding which threads "take" the branch (indicated by 1's), and which threads "do not take" the branch (indicated by 0's).

In step 604, the compiler 101 checks the branch-taken target of the analysis region to see if the branch-taken target has multiple predecessors. If the branch-taken target does not have multiple predecessors, the method 600 proceeds to step 606. If the branch-taken target does have multiple predecessors, then there is a possible convergence of threads from different regions. In other words, threads executing the analysis region, as well as threads executing any other predecessor of the branch-taken target, may converge at the branch-taken target. Therefore, in step 606, the compiler 101 inserts instructions to merge threads from the analysis region that take the branch with the threads waiting to execute the branch-taken target.

The compiler 101 may perform step 606 by inserting instructions corresponding to the pseudo-code s|=m & C, where "s" is the predicate mask variable (similar to the one shown in FIG. 5B) for the branch-taken target, "|=" is the bitwise OR compound assignment operator, m is the predicate mask variable (similar to the one shown in FIG. 5B) for the analysis region R, "&" is the bitwise AND operator, and "C" is the branch condition bitmask variable for the branch detected in step 602.

The expression "m & C", where "&" is the bitwise AND operator, provides a result bitmask which, for each thread represented by a bit in the result bitmask, there exists a "1" only if the corresponding thread was both executing R, and takes the branch referenced in step 602. Thus, the expression "m & C" produces a bitmask that indicates which threads from R take the branch.

The bitwise OR operator in the expression s|=m & C indicates the merging of threads that take the branch that was removed from the analysis region with threads from the other predecessors of the branch-taken target. The bitwise OR operator keeps all previous threads indicated with 1's in the predicate mask variable for the branch-taken target (also referred to with the symbol "s"), and adds new threads from the analysis region. The compiler 101 executes the method 600 represented in the flow diagram in FIG. 6 for all other regions, including the predecessors of the branch-taken target referred to above. Thus, instructions exist in all predecessors of the branch-taken target for updating the predicate mask variable for the branch-taken target. The bitwise OR ensures that all threads indicated by update mask variable instructions in all predecessors of the branch-taken target are merged together at the branch-taken target.

If the branch-taken target does not have multiple predecessors, the method 600 proceeds to step 608, and inserts instructions to assign threads that take the branch that was removed from the analysis region to the branch-taken target.

The compiler 101 may perform step 608 by inserting instructions corresponding to the pseudo-code s=m & C. In step 608, there is no convergence of threads from other predecessor regions of the branch-taken target. Therefore, the compiler 101 may not require the bitwise OR operator, and the compiler 101 may simply assign the value "m & C" (which indicate which threads from the analysis region take the branch) to the predicate bitmask variable for the branch-taken target, corresponding to symbol "s."

The compiler 101 next proceeds to step 610. In step 610, the compiler 101 checks to see if the branch-not-taken target has multiple predecessors. If the branch-not-taken target does have multiple predecessors, the compiler 101 proceeds to step 612, and inserts instructions to merge the threads not taking the branch with threads waiting to execute the branch-not-taken target.

The compiler may perform step 612 by inserting instructions corresponding to the pseudo-code n|=m & ~C, where "n" is the predicate mask variable for the branch-not-taken target, and "~" is the bitwise NOT operator. The expression "m & ~C" represents the threads from the current region that do not take the branch. The expression "~C" is the bitwise NOT of the branch condition bitmask variable C, and represents threads that do not take the branch. Conceptually, since the bitwise NOT operation flips all bits in a bitmask (i.e., from 0 to 1 and from 1 to 0), and since all bits in bitmask C represent which threads take the branch, the expression "~C" represents all threads that do not take the branch. For example, if the second bit of C was a 1, which indicates that the second thread takes the branch, then the second bit of the bitwise NOT of C, ~C, is equal to 0, which indicates that the second thread does not take the branch. Thus, the expression "m & ~C" indicates which threads executing R do not take the branch. The expression n|=m & ~C merges the threads from the branch-not-taken target with the threads from the analysis region that do not take the branch, in a similar manner as described with respect to steps 606 and 608.

If the branch-not-taken target does not have multiple predecessors, the compiler 101 proceeds to step 614, and inserts instructions to assign the threads from the analysis region that do not take the branch to the branch-not-taken target.

The compiler 101 may perform step 614 by inserting instructions corresponding to the pseudo-code n=m & ~C. As explained above with respect to steps 606, 608 and 612, this expression indicates that the threads that do not take the branch (m & ~C) are simply assigned to the branch-not-taken target.

Referring back to step 602, if the compiler 101 does not detect a branch at the end of the analysis region in step 602, then the analysis region only has one successor, and the method 600 proceeds to step 616. Since there is no branch, all threads from region R pass to its successor region. Thus, the compiler 101 inserts instructions to either merge or assign all threads from the current region to the successor region. Also, since there is only one successor, the compiler 101 only inserts instructions for assigning the value of one bitmask variable, the bitmask variable for the successor, s.

In step 616, the compiler 101 checks to see whether the successor of R has multiple predecessors. The compiler 101 assigns the value of s in either step 618 or 620, depending on whether the successor of R has multiple predecessors. The logic is similar as with respect to steps 606 and 612. In other words, if there are multiple predecessors to the successor of R, then the compiler 101 inserts instructions to merge the threads from R with the threads from the multiple predecessors. If there are not multiple predecessors to the successor of R, then the compiler 101 simply assigns the threads executing R to the threads in the successor.

In step 616, if the successor of the analysis region does have multiple predecessors, then the method 600 proceeds to step 618, and inserts instructions to merge threads executing the analysis region with threads waiting to execute the successor region. In step 618, since the successor has multiple predecessors, the compiler 101 inserts instructions to combine threads waiting to execute the successor of the analysis region, which threads indicated in variable s, with the threads currently executing the analysis region, which threads are indicated in variable m, using the bitwise OR operation. The compiler 101 may perform step 618 by inserting instructions corresponding to the pseudo-code s|=m.

If in step 616, the compiler 101 determines that the successor does not have multiple predecessors, the method 600 advances to step 620. In step 620, since the successor only has one predecessor, which is region R, no other threads can be waiting to execute the successor, and all threads from R pass to the successor. The compiler 101 may insert instructions corresponding to the expression s=m to perform step 620. The method 600 terminates in step 622 after the compiler 101 has finished steps 612, 614, 618, or 620.

For purposes of illustration, the method 600 of FIG. 6 is now applied below to region 2 502-2 shown in the control flow graph 500 of FIG. 5A, and reference is made to both FIGS. 5A and 6. Example pseudo-code expressions are used to help illustrate the steps the compiler 101 performs.

In step 602, the compiler 101 checks region 2 502-2 to see whether region 2 502-2 ends in a branch. As can be seen by arrows 506-3 and 506-4, region 2 502-2 does end in a branch. Therefore, the compiler 101 proceeds to step 604. In step 604, the compiler 101 checks the branch-taken target of region 2 502-2 to see whether the branch-taken target has multiple predecessors. The branch taken target of region 2 502-2 is region 4 502-4 (for simplicity, in FIG. 5A, all branch targets on the left of a region are considered the branch-taken target, and all branch targets on the right of a region are considered the branch-not-taken target). As can be seen, the branch taken target, region 4 502-4 only has one predecessor, which is region 2 502-2. Therefore, the compiler 101 proceeds to step 608.

In step 608, the compiler 101 inserts instructions corresponding to the pseudo-code s=m & C into the check block 510-2 of region 2 502-2. This statement sets the predicate mask variable of Region 4 502-4, here indicated as "s", to be equal to the bitwise AND of the predicate mask for Region 2 502-2, and the condition of the branch at the end of Region 2 502-2. Logically, this makes sense, as all threads that take the branch at the end of region 2 502-2 flow to region 4 502-4.

In step 610, the compiler 101 checks region 5 502-5 to see whether region 5 502-5 has multiple predecessors. Region 5 502-5 does have multiple predecessors, since both region 3 502-3 and region 2 502-2 are predecessors of region 5 502-5. The compiler 101 proceeds to step 612 and inserts the instructions corresponding to the pseudo-code n|=m & ~C. These instructions set the predicate mask variable of Region 5 502-5, here indicated as "n", to be equal to the bitwise OR of the previous value of "n" with the bitwise AND of the predicate mask for the Region 2 502-2, which is "m", and the bitwise NOT of the branch condition C. Logically, this corresponds with merging threads waiting to execute Region 5 502-5 with the threads that pass from Region 2 502-2 to Region 5 502-5.

The compiler 101 proceeds to step 622 and ends the method shown in FIG. 6. The instructions inserted by the compiler 101 into the check block 510-2 of region 2 502-2 in this example comprise the following:

s=m&C
n|=m&~C

According to these instructions, when the program represented by control flow graph 500 is running, check block 510-2 updates the predicate mask variables of regions 4 and 5. These instructions are placed in mask update instructions 530 in check block 510-2 shown in FIGS. 5A and 5C.

FIG. 7 is a flow diagram of method steps for determining the checks and conditional branch instructions discussed with respect to steps 410 and 412 in FIG. 4, according to one embodiment of the present invention. Although the method steps are described in conjunction with FIGS. 1-3 and 5A-5C, persons skilled in the art will understand that any system configured to perform the method steps, in any order, falls within the scope of the present invention.

The method 700 depicted in FIG. 7 determines checks and conditional branch instructions for a single region, the region being analyzed by the compiler 101, also referred to as the analysis region, or region R. To determine checks and conditional branch instructions for every region in a control graph, the method in FIG. 7 is repeated for all such regions.

To avoid confusion, regions other than R that are analyzed by the compiler 101 performing the steps shown in FIG. 7 are referred to herein as "thread frontier regions" or by the symbol "[Rx]" and the predicate mask variable for a thread frontier region is referred to herein as "[x]", where "x" may be replaced by the region number of the regions in FIG. 5A.

As shown, a method 700 begins with step 701, where the compiler 101 selects an analysis region from a control flow graph (such as control flow graph 500 depicted in FIG. 5A). The compiler 101 already knows the thread frontier for the analysis region because it has executed step 404 in FIG. 4. In step 702, the compiler 101 determines the thread frontier region as the region in the thread frontier of the analysis region with the highest priority.

In step 704, the compiler 101 inserts instructions to branch to the thread frontier region if the predicate mask variable for the thread frontier region with the highest priority indicates that there are threads waiting to execute the thread frontier region with the highest priority. The compiler 101 may use instructions corresponding to the pseudo-code if [x] goto [Rx] for step 704. Conceptually, this states "if there are any threads waiting in the thread frontier region, transfer program control to the thread frontier region." The statement "if [x]" may be implemented by taking a bitwise OR across all bits in variable [x], which produces a 1 (true) if there are any 1's in [x] and a 0 (false) if there are no 1's in [x].

In step 706, the compiler 101 checks to see whether there are any regions in the thread frontier that have not been analyzed yet. If there are, the method 700 proceeds to step 708, and otherwise, the method ends in step 710.

For purposes of illustration, the method shown in FIG. 7 is now be applied to region 2 502-2 shown in the control flow graph 500 in FIG. 5A, and reference is made to both FIGS. 5A and 7. Example pseudo-code expressions are used to help illustrate the steps the compiler 101 takes.

For step 702, the compiler 101 examines the thread frontier of region 2 502—in the example control flow graph 500 shown in FIG. 5A. The thread frontier of region 2 502-2 comprises region 3 502-3, region 4 502-4 and region 5 502-5. Out of these, the region with the highest priority is region 3 502-3, which has priority 6 504-3.

The compiler 101 advances to step 704 and inserts check and branch instructions in the check block 510 at the end of region 2 502-2. In the example control flow graph 500 shown in FIG. 5, because region 3 has the highest priority, instructions corresponding to region 3 are inserted. The corresponding pseudo-code is "if [3] goto [R3]"

Next, in step 706, the compiler 101 checks to see whether there are any threads in the thread frontier that have not yet been analyzed. In the example control flow graph 500, there are still two regions in the thread frontier of region 2 502-2 that have not yet been analyzed, which are region 4 502-4 and region 5 502-5. Out of these, region 5 502-5 has the highest priority. The method proceeds to step 704, where the compiler 101 inserts the corresponding if and goto instructions: if [5] goto [R5]. The method 700 then proceeds to step 706, and determines that there is still one thread in the thread frontier. Thereafter, the method proceeds again to step 704, and the instruction if [4] goto [R4] is inserted. Finally, because no regions remain in the thread frontier, the method proceeds to step 710 and ends analysis of the analysis region.

The pseudo-code for the example control flow graph 500 that results from this procedure is the following:
if [3] goto [R3]
if [5] goto [R5]
if [4] goto [R4]

As can be seen, when the program represented by control flow graph 500 is running, check block 510-2 first checks to see if there are threads waiting in Region 3, and if so, goes there, then checks to see if there are threads waiting in Region 5, and if so goes there, and then checks to see if there are threads waiting in Region 4, and if so, goes there. By ordering the statements in priority-order, execution priority of the regions is enforced.

The last "if" statement may be removed. This is because if there are no threads waiting in all the other regions checked, control flows to the last remaining region. This produces the pseudo-code:
if [3] goto [R3]
if [5] goto [R5]
goto [R4]

Further, if all successors of R have higher priorities than all other regions in the thread frontier of R, control transfers to one of the successors of R, and if and goto statements are not needed for regions in the thread frontier of R that are not successors of R.

It should be recognized that the pseudo-code referenced in FIGS. 6 and 7 conceptually represents computer instructions but does not necessarily represent instructions in any specific programming language, instruction set, or the like.

In sum, compiler-implemented techniques are provided herein for enforcing priority order of regions in a program structure. Using these techniques, the compiler modifies program code by inserting instructions to perform a series of checks and branches in each region. For each region, the series of checks and branches determines where control should flow to next. The checks and branches are arranged in priority order, which helps to enforce priority order of execution. The compiler also inserts instructions to update predicate mask variables for each region in order to ensure that the correct threads are executing within each region. The instructions to update predicate mask variables also assist with enforcing priority order of execution.

An advantage of the techniques provided herein is that regions are executed in priority order. An additional advantage of the techniques disclosed herein is that divergent threads re-converge early. Yet another advantage is that because the techniques are implemented by the compiler, no specialized hardware support is required.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The claimed invention is:

1. A method for scheduling threads to execute different regions of a program, the method comprising:
   analyzing a control flow graph that is based on program code and includes a plurality of regions, wherein each region represents a different portion of the program code, is assigned an execution priority, and is associated with a thread frontier that includes one or more thread frontier regions, each thread frontier region being a region in the control flow graph;
   inserting one or more update predicate mask variable instructions at the end of a first region included in the plurality of regions based on the control flow graph and the program code; and
   inserting one or more conditional branch instructions at the end of the first region that are arranged to reflect execution priority of the one or more thread frontier regions in the thread frontier of the first region.

2. The method of claim 1, further comprising determining that a branch instruction is included at the end of the first region, and replacing the branch instruction with an instruction configured to calculate a branch condition bitmask variable for the first region.

3. The method of claim 2, wherein each region in the control flow graph has one or more successor regions and one or more predecessor regions, each successor region being a region in the control flow graph, and each predecessor region being a region in the control flow graph, and wherein the branch instruction at the end of the first region has a branch-taken target region that is a region in the plurality of regions in the control flow graph and a branch-not-taken target region that is a region in the plurality of regions in the control flow graph, and inserting one or more update predicate mask variable instructions further comprises:
   determining that the branch-taken target region has multiple predecessor regions, and inserting instructions configured to merge threads that take the branch in the first region with threads waiting to execute the branch-taken target region; or
   determining that the branch-taken target region does not have multiple predecessor regions, and inserting instructions configured to assign threads that take the branch in the first region to the branch-taken target region.

4. The method of claim 3, further comprising:
   determining that the branch-not-taken target region has multiple predecessor regions, and inserting instructions configured to merge threads not taking the branch in the first region with threads waiting to execute the branch-not-taken target region; or
   determining that the branch-not-taken target region does not have multiple predecessor regions, and inserting instructions configured to assign threads that do not take the branch in the first region to the branch-not-taken target region.

5. The method of claim 1, wherein each region in the control flow graph has one or more successor regions and one or more predecessor regions, each successor region being a region in the control flow graph, and each predecessor region being a region in the control flow graph, and wherein inserting a first set of update predicate mask variable instructions further comprises:
   determining that a branch instruction is not included at the end of the first region; and either determining that a successor region of the first region has multiple predecessor regions, and inserting instructions configured to merge threads executing the first region with the threads waiting to execute the successor region, or determining that a successor region of the first region does not have multiple predecessor regions, and inserting instructions configured to assign threads executing the first region to the successor region of the first region.

6. The method of claim 1, wherein inserting the one or more conditional branch instructions further comprises:
   inserting a plurality of conditional branch instructions at the end of the first region in order of execution priority of the thread frontier regions in the thread frontier of the first region, each conditional branch instruction having a respective target thread frontier region, each conditional branch instruction being configured to:
      determine whether threads are waiting to execute the respective target thread frontier region in the thread frontier of the first region and branch to the target thread frontier region if threads are waiting to execute the respective target thread frontier region.

7. The method of claim 1, further comprising inserting one or more instructions at the beginning of the first region to set a predicate mask for the first region.

8. The method of claim 1, further comprising optimizing the one or more update predicate mask variable instructions and the one or more conditional branch instructions by performing one or more of dead code elimination and loop-invariant code motion.

9. The method of claim 1, further comprising:
   inserting one or more update predicate mask variable instructions at the end of a second region in the plurality of regions; and
   inserting one or more conditional branch instructions at the end of the second region, the conditional branch instructions being arranged in order of execution priority of the thread frontier regions in a thread frontier of the second region.

10. A non-transitory computer-readable medium storing instructions, that when executed by a processor, cause a computer system to schedule threads to execute different regions of a program, by performing the steps of:
analyzing a control flow graph that is based on program code and includes a plurality of regions, wherein each region represents a different portion of the program code, is assigned an execution priority, and is associated with a thread frontier that includes one or more thread frontier regions, each thread frontier region being a region in the control flow graph;
inserting one or more update predicate mask variable instructions at the end of a first region included in the plurality of regions based on the control flow graph and the program code; and
inserting one or more conditional branch instructions at the end of the first region that are arranged to reflect execution priority of the one or more thread frontier regions in the thread frontier of the first region.

11. The non-transitory computer-readable medium of claim 10, further comprising:
determining that a branch instruction is included at the end of the first region, and replacing the branch instruction with an instruction configured to calculate a branch condition bitmask variable for the first region.

12. The non-transitory computer-readable medium of claim 11, wherein:
each region in the control flow graph has one or more successor regions and one or more predecessor regions, each successor region being a region in the control flow graph, and each predecessor region being a region in the control flow graph, and wherein the branch instruction at the end of the first region has a branch-taken target region that is a region in the plurality of regions in the control flow graph and a branch-not-taken target region that is a region in the plurality of regions in the control flow graph, and inserting one or more update predicate mask variable instructions further comprises:
determining that the branch-taken target region has multiple predecessor regions, and inserting instructions configured to merge threads that take the branch in the first region with threads waiting to execute the branch-taken target region; or
determining that the branch-taken target region does not have multiple predecessor regions, and inserting instructions configured to assign threads that take the branch in the first region to the branch-taken target region.

13. The non-transitory computer-readable medium of claim 12, further comprising:
determining that the branch-not-taken target region has multiple predecessor regions, and inserting instructions configured to merge threads not taking the branch in the first region with threads waiting to execute the branch-not-taken target region; or
determining that the branch-not-taken target region does not have multiple predecessor regions, and inserting instructions configured to assign threads that do not take the branch in the first region to the branch-not-taken target region.

14. The non-transitory computer-readable medium of claim 10, wherein each region in the control flow graph has one or more successor regions and one or more predecessor regions, each successor region being a region in the control flow graph, and each predecessor region being a region in the control flow graph, and wherein inserting a first set of update predicate mask variable instructions further comprises:
determining that a branch instruction is not included at the end of the first region, and either determining that a successor region of the first region has multiple predecessor regions, and inserting instructions configured to merge threads executing the first region with the threads waiting to execute the successor region, or determining that a successor region of the first region does not have multiple predecessor regions, and inserting instructions configured to assign threads executing the first region to the successor region of the first region.

15. The non-transitory computer-readable medium of claim 10, wherein inserting the one or more conditional branch instructions further comprises:
inserting a plurality of conditional branch instructions at the end of the first region in order of execution priority of the thread frontier regions in the thread frontier of the first region, each conditional branch instruction having a respective target thread frontier region, each conditional branch instruction being configured to:
determine whether threads are waiting to execute the respective target thread frontier region in the thread frontier of the first region and branch to the target thread frontier region if threads are waiting to execute the respective target thread frontier region.

16. The non-transitory computer-readable medium of claim 10, further comprising inserting one or more instructions at the beginning of the first region to set a predicate mask for the first region.

17. The non-transitory computer-readable medium of claim 10, further comprising optimizing the one or more update predicate mask variable instructions and the one or more conditional branch instructions by performing one or more of dead code elimination and loop-invariant code motion.

18. The non-transitory computer-readable medium of claim 10, further comprising:
inserting one or more update predicate mask variable instructions at the end of a second region in the plurality of regions; and
inserting one or more conditional branch instructions at the end of the second region, the conditional branch instructions being arranged in order of execution priority of the thread frontier regions in a thread frontier of the second region.

19. A computing device for scheduling threads to execute different regions of a program, the computing device comprising:
a processor; and
a memory coupled to the processor, wherein the memory includes a compiler having instructions that, when executed by the processor, cause the processor to:
analyze a control flow graph that is based on program code and includes a plurality of regions, wherein each region represents a different portion of the program code, is assigned an execution priority, and is associated with a thread frontier;
insert one or more update predicate mask variable instructions at the end of a first region included in the plurality of regions based on the control flow graph and the program code; and insert one or more conditional branch instructions at the end of the first region that are arranged based on the thread frontier associated with the first region.

20. The computing device of claim 19, the memory further including instructions that, when executed by the processor, cause the processor to:

determine that a branch instruction is included at the end of the first region, and replace the branch instruction with an instruction configured to calculate a branch condition bitmask variable for the first region.

21. The computing device of claim 19, wherein the one or more conditional branch instruction at the end of the first region are arranged to reflect execution priority of one or more thread frontier regions included in the thread frontier associated with the first region.

* * * * *